US008508090B2

(12) United States Patent
Tanaka et al.

(10) Patent No.: US 8,508,090 B2
(45) Date of Patent: Aug. 13, 2013

(54) LUBRICATION STRUCTURE OF POWER TRANSMISSION APPARATUS (75) Inventors: Koichi Tanaka, Okazaki (JP); Terasu Harashima, Toyota (JP); Rikiya Kubo, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/203,840

(22) PCT Filed: Feb. 19, 2010

(86) PCT No.: PCT/JP2010/001075
§ 371 (c)(1),
(2), (4) Date: Aug. 30, 2011

(87) PCT Pub. No.: WO2011/101911
PCT Pub. Date: Aug. 25, 2011

(65) Prior Publication Data
US 2012/0299419 A1    Nov. 29, 2012

(51) Int. Cl.
*H02K 7/08* (2006.01)
*H02K 9/00* (2006.01)
*F16D 13/00* (2006.01)
*F16H 57/04* (2010.01)

(52) U.S. Cl.
USPC ............ 310/90; 310/52; 310/54; 192/113.32; 475/159

(58) Field of Classification Search
USPC ... 310/52–54, 58, 90; 180/65.1; 192/113.32; 475/150, 159, 160
See application file for complete search history.

(56) References Cited

U.S. PATENT DOCUMENTS

| 3,089,046 A * | 5/1963 | Jaeschke ..................... 310/105 |
| 2009/0127954 A1* | 5/2009 | Mogi .............................. 310/90 |
| 2011/0084561 A1* | 4/2011 | Swales et al. ................... 310/54 |

FOREIGN PATENT DOCUMENTS

| JP | 7-103318 | 4/1995 |
| JP | 2000-240770 | 9/2000 |
| JP | 2001-12584 | 1/2001 |

(Continued)

OTHER PUBLICATIONS

International Search Report in International Application No. PCT/JP2010/001075; Mailing Date: Apr. 13, 2010.

*Primary Examiner* — Tran N. Nguyen
*Assistant Examiner* — Jose Gonzalez Quinones
(74) *Attorney, Agent, or Firm* — Finnegan, Henderson, Farabow, Garrett & Dunner, LLP (57) ABSTRACT PROBLEM TO BE SOLVED: A lubrication structure of a power transmission apparatus is provided with a lubricating liquid transport pipe for cooling a rotating electrical machine used to allow a lubricated member positioned axially outwardly of the rotating electrical machine to be lubricated in the axial direction.
SOLUTION: A lubrication structure comprises an oil pipe 44 having discharge nozzles 44a, 44c positioned vertically above coil ends 20a, 20b and discharge nozzles 44d, 44e axially outwardly of the discharge nozzle 44c in juxtaposed relationship with each other at the other axial end portion of the oil pipe 44, and a guide member 22 radially extending between the discharge nozzles 44d, 44e in the axial direction of a motor M and having a radially inner peripheral portion covering bearings 24, 42. The guide member 22 has a guide rib extending axially outwardly of a flange portion 22a to guide the oil discharged from the discharge nozzle 44e in the axial direction. A cover 13 has a cylindrical portion 13a covering the upper surface of a bearing 43. The cylindrical portion 13a is formed with an oil passage 13b for guiding the oil guided by the guide rib 22d to one axial end portion B of the bearing 43.

7 Claims, 5 Drawing Sheets

(56) References Cited

FOREIGN PATENT DOCUMENTS

| | | |
|---|---|---|
| JP | 2005-253263 | 9/2005 |
| JP | 2006-115650 | 4/2006 |
| JP | 2007-9947 | 1/2007 |
| JP | 2009-254042 | 10/2009 |

* cited by examiner

FIG.5
PRIOR ART

LUBRICATION STRUCTURE OF POWER TRANSMISSION APPARATUS

CROSS-REFERENCE TO RELATED APPLICATIONS

This application is a national phase application of International Application No. PCT/JP2010/001075, filed Feb. 19, 2010, the contents of which are incorporated herein by reference.

TECHNICAL FIELD

The present invention relates to a lubrication structure of a power transmission apparatus, and more particularly, to a lubrication structure of a power transmission apparatus for lubricating first and second lubricated members provided axially outwardly of a rotating electrical machine by lubricating liquid falling from above the first and the second lubricated members.

BACKGROUND ART

In general, a rotating electrical machine such as a motor, a generator and the like to be mounted on a vehicular transaxle for an automotive vehicle is constructed to include a rotatable rotor, and a stator having a stator core provided around the outer circumferential portion of the rotor and a stator coil wound around the stator core.

The motor can obtain rotational force when the stator coil is energized, while the generator can be drawn electric current flowing in the stator coil by the rotation of the rotor.

When the rotor is rotated to have the electric current flow in the stator coil, there is caused heat in the stator core and the stator coil. The heat of the stator core and the stator coil affects magnetic flux penetrating through the inner portions of the motor and the generator, thereby decreasing operating efficiency (rotation efficiency, generation efficiency). It is therefore required to cool the rotating electrical machine in order to maintain the operating efficiency.

The rotating electrical machine as mentioned above is mounted on a vehicle in the form of being covered by a case. Therefore, there are many cases in which the rotating electrical machine is cooled by oil passing through an oil passage formed in the case, viz., the rotating electrical machine is applied with liquid cooling.

Figure 5:
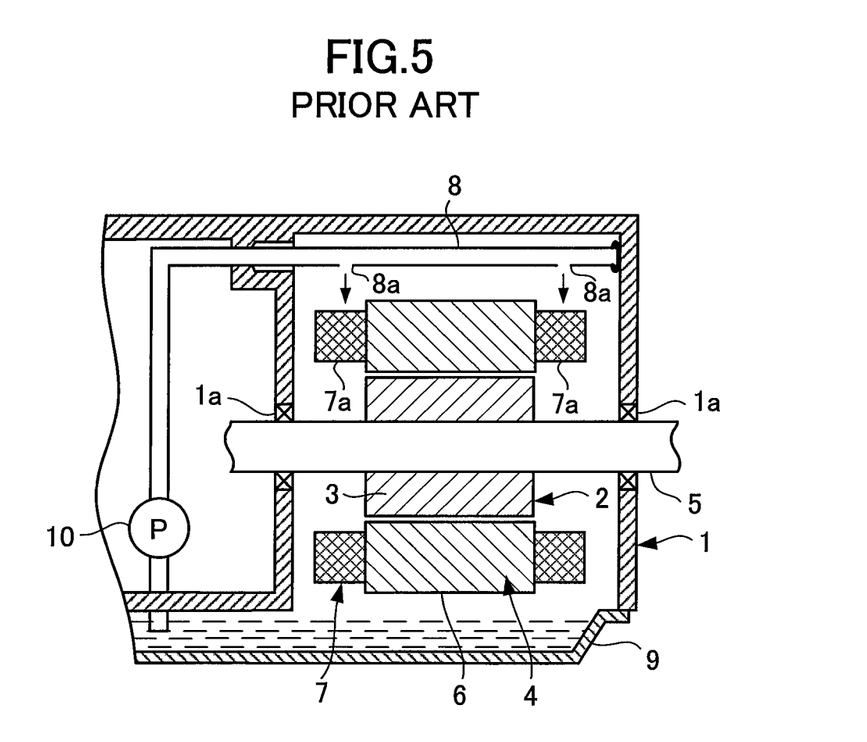
FIG. 5 is a schematic view of a lubrication structure of a conventional rotating electrical machine.

A typical example known as a conventional cooling structure of this kind of a power transmission apparatus is shown in FIG. 5 (see for example Patent Document 1).

In FIG. 5, there is provided a rotating electrical machine 2 provided in a case 1 of a vehicular transaxle and has a rotor 3, and a stator 4 provided around the rotor 3 to surround the rotor 3.

The rotor 3 is mounted on a shaft 5 extending along the center line of the rotor 3. The shaft 5 is rotatably supported on the case 1 through a bearing 1a.

The stator 4 comprises a stator core 6, and a stator coil 7 wound around the stator core 6, so that the stator coil 7 energized can generate a magnetic field which in turn forms a magnetic flux between the rotor 3 and the stator 4 to make the rotor 3 obtain the rotational force.

Inside the case 1, provided is an oil pipe 8 which is positioned above the rotating electrical machine 2 and has an inner passage allowing the oil to pass therethrough. The oil pipe 8 is adapted to allow the oil to pass therethrough when the oil stored in an oil pan 9 provided at the lower portion of the case 1 is drawn up by an oil pump 10.

The oil pipe 8 is formed with discharge nozzles 8a in face-to-face relationship with the coil ends 7a of the stator coil 7 outwardly projecting from both axial ends of the stator core 6 so that the oil flowing in the oil pipe 8 can be discharged to the coil ends 7a from the discharge nozzles 8a.

The oil discharged to the coil ends 7a is designed to fall along the peripheral portions of the coil ends 7a that is heated to a highest temperature in the stator coil 7 to the lower portions of the coil ends 7a. While the oil falling from the coil ends 7a, the heat of the coil ends 7a is transmitted to the oil, thereby cooling the stator 4.

PATENT DOCUMENTS

Patent Document 1: Patent Publication No. 2006-115650

SUMMARY OF INVENTION

Problems to be Solved

The conventional cooling structure of the rotating electrical machine 2 is constructed to cool the rotating electrical machine 2 by the oil having a viscosity, so that it is conceived to lubricate the bearing 1a rotatably supporting the shaft 5 on the case 1 by using the oil.

However, the bearing 1a is positioned axially outwardly of the rotor 3 from the discharge nozzle 8a of the oil pipe 8 and has an upper portion covered by the case 1, thereby leading to difficulties in supplying in the direction of the bearing 1a the oil falling from the discharge nozzle 8a, viz., the oil freely falling from the discharge nozzle 8a.

As a consequence, it is impossible to use the oil pipe 8 for cooling the rotating electrical machine 2 to lubricate the bearing 1a, thereby giving rise to such a problem that a cooling structure dedicated for cooling the bearing 1a is required.

The present invention has been made to solve the conventional problem as stated above, and thus have an object to provide a lubrication structure of a power transmission apparatus capable of lubricating the overall axial portions of the lubricated member provided axially outwardly of the rotating electrical machine by using a lubricating liquid transportation pipe for cooling the rotating electrical machine.

Means for Solving Problems

To achieve the above object, the lubrication structure of the power transmission apparatus according to the present invention is, (1) provided in a power transmission apparatus comprising a rotating electrical machine accommodated in the case having a rotatable rotor, a stator having a stator core provided to surround the rotor, and coil ends axially outwardly projecting from both axial ends of the stator core; a first lubricated member positioned in a neighborhood of the rotating electrical machine in an axial direction of the rotating electrical machine; and a second lubricated member positioned axially outwardly of the first lubricated member, to supply lubricating liquid to the first and the second lubricated members, further comprising a lubricating liquid transport pipe having a first discharge nozzle provided above the rotating electrical machine and at least vertically above the coil ends to transport the lubricating liquid from one axial end to the other axial end in the axial direction and a second discharge nozzle and a third discharge nozzle provided axially outwardly of the first discharge nozzle in juxtaposed relationship with each other, and a guide member provided between the second discharge nozzle and the third discharge nozzle in the axial direction of the rotating electrical machine to radially extend and having a radially inner peripheral portion covering an upper surface of the first lubricated member, in which the guide member has a guide rib axially outwardly extending from the guide member to guide the lubricating liquid discharged from the third discharge nozzle in the axial direction, the case has a cover portion covering an upper surface of the second lubricated member, and the cover portion is formed with a case oil passage for guiding the lubricating liquid guided by the guide rib to one axial end portion of the second lubricated member.

The lubrication structure of the power transmission apparatus comprises the lubricating liquid transport pipe having the first discharge nozzle provided vertically above the coil ends, and the second discharge nozzle and the third discharge nozzle provided axially outwardly of the first discharge nozzle in juxtaposed relationship with each other, and the guide member provided between the second discharge nozzle and the third discharge nozzle in the axial direction to radially extend and having the radially inner peripheral portion covering the first lubricated member, in which the guide member has a guide rib axially outwardly extending from the guide member to guide the lubricating liquid discharged from the third discharge nozzle in the axial direction, the case has the cover portion covering the upper surface of the second lubricated member, and the cover portion is formed with the case oil passage for guiding the lubricating liquid guided by the guide rib to the one axial end portion of the second lubricated member, so that when it is to cool the second lubricated member outwardly of the first lubricated member in the axial direction of the rotating electrical machine, the lubricating liquid fallen from the third nozzle can be supplied to the one axial end portion of the second lubricated member through the guide member, the guide rib, and the case oil passage.

As a result, the oil pipe used to supply the oil for cooling the coil ends of the rotating electrical machine can be used to lubricate the second lubricated member provided axially outwardly of the rotating electrical machine, and thus eliminate the need for a new lubrication structure for lubricating the second lubricated member.

In the lubrication structure of the power transmission apparatus defined in the above (1), (2) the guide member has a guide member oil passage extending radially of the guide member to guide the lubricating liquid discharged from the second discharge nozzle to one axial end portion of the first lubricated member.

In the lubrication structure of the power transmission apparatus above, the guide member has the guide member oil passage extending radially of the guide member to guide the lubricating liquid discharged from the second discharge nozzle to the one axial end portion of the first lubricated member, so that the one axial end portion of the first lubricated member can be lubricated in addition to the second lubricated member.

In the lubrication structure of the power transmission apparatus defined in the above (1) or (2), (3) the first lubricated member is provided in a pair in juxtaposed relationship with each other in the radially inner peripheral portion of the guide member, and the guide member oil passage is positioned between the pair of first lubricated members in the axial direction.

In the lubrication structure of the power transmission apparatus above, the first lubricated member is provided in a pair in juxtaposed relationship with each other in the radially inner peripheral portion of the guide member, and the guide member oil passage is positioned between the pair of first lubricated members in the axial direction, so that the lubricating liquid can be supplied to the one axial end portions of the first lubricated members through the guide member oil passage. As a consequence, the pair of first lubricated members can be lubricated in the axial direction in addition to the second lubricated member, thereby making it possible to lubricate the three lubricated members positioned in the inner peripheral portion of the cover portion of the case and in the radially inner peripheral portion of the guide member.

In the lubrication structure of the power transmission apparatus defined in the above (3), (4) the first lubricated member is constituted by a first bearing having a first outer race attached to the radially inner peripheral portion of the guide member and a first inner race connected to an inner peripheral portion of the first outer race through a first rolling member, and the second lubricated member is constituted by a second bearing having a second outer race attached to an inner peripheral portion of the cover portion and a second inner race connected to an inner peripheral portion of the second outer race through a second rolling member.

The lubrication structure of the power transmission apparatus above can reliably supply the lubricating liquid to the one axial end portions of the first and the second bearings having the first and the second outer races having respective upper surfaces covered with the inner peripheral portion of the guide member and the cover portion of the case, respectively, so that the first and the second bearings can be reliably lubricated with the lubricating liquid.

Effects of Invention

The lubrication structure of the power transmission apparatus according to the present invention can use the oil pipe for cooling the rotating electrical machine to lubricate the lubricated member provided axially outwardly of the rotating electrical machine.

DESCRIPTION OF EMBODIMENTS

An exemplary embodiment of the lubrication structure of the power transmission apparatus according to the present invention will be explained hereinafter with reference to the drawings.

FIGS. 1 to 4 show one embodiment of the lubrication structure of the power transmission apparatus according to the present invention.

The construction of the embodiment of the lubrication structure will firstly be explained.

Figure 1:
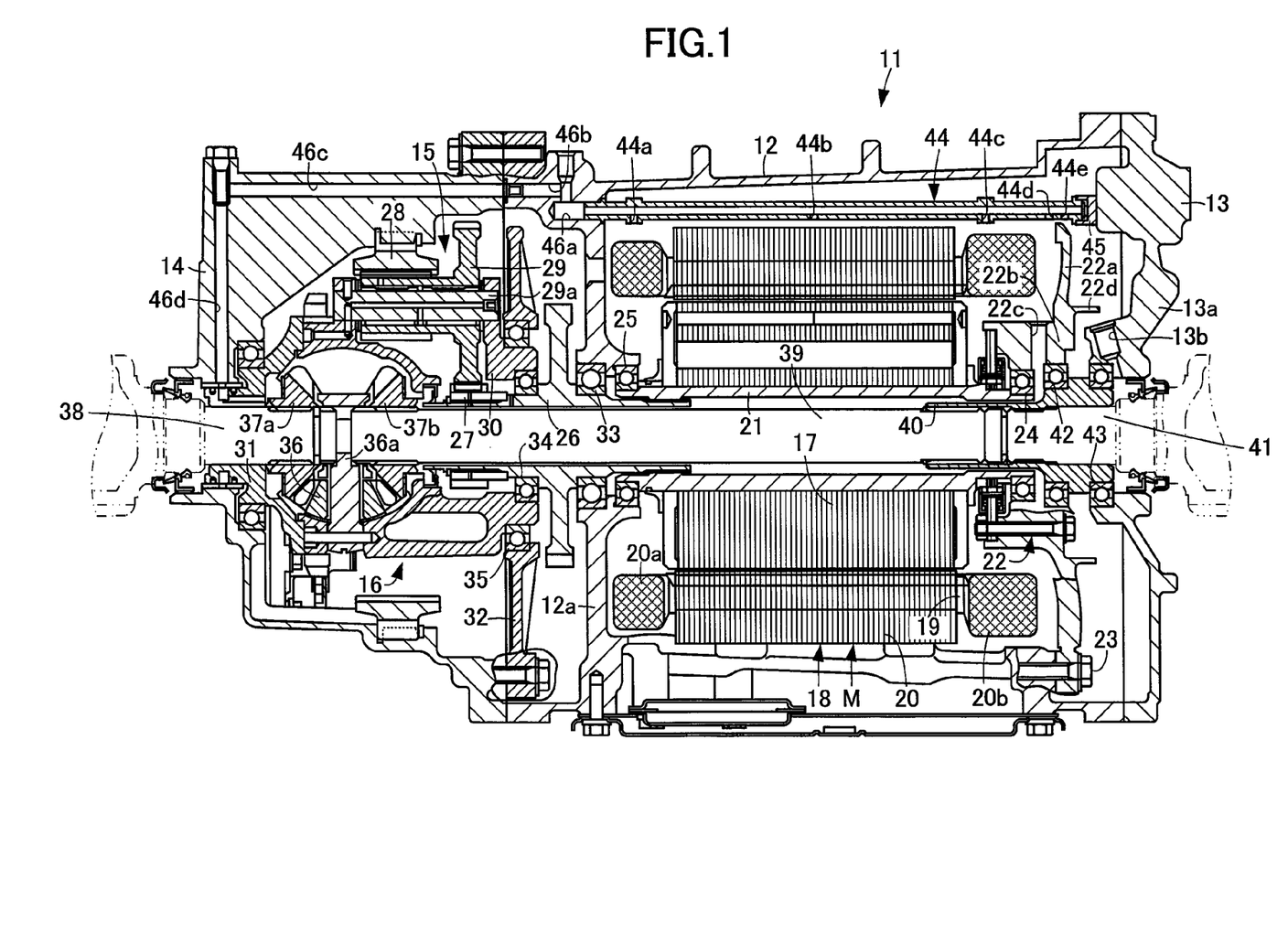
FIG. 1 shows one embodiment of a lubrication structure of a power transmission apparatus according to the present invention, and is a cross sectional view of a transaxle for an electric automotive vehicle and a hybrid vehicle.
Figure 2:
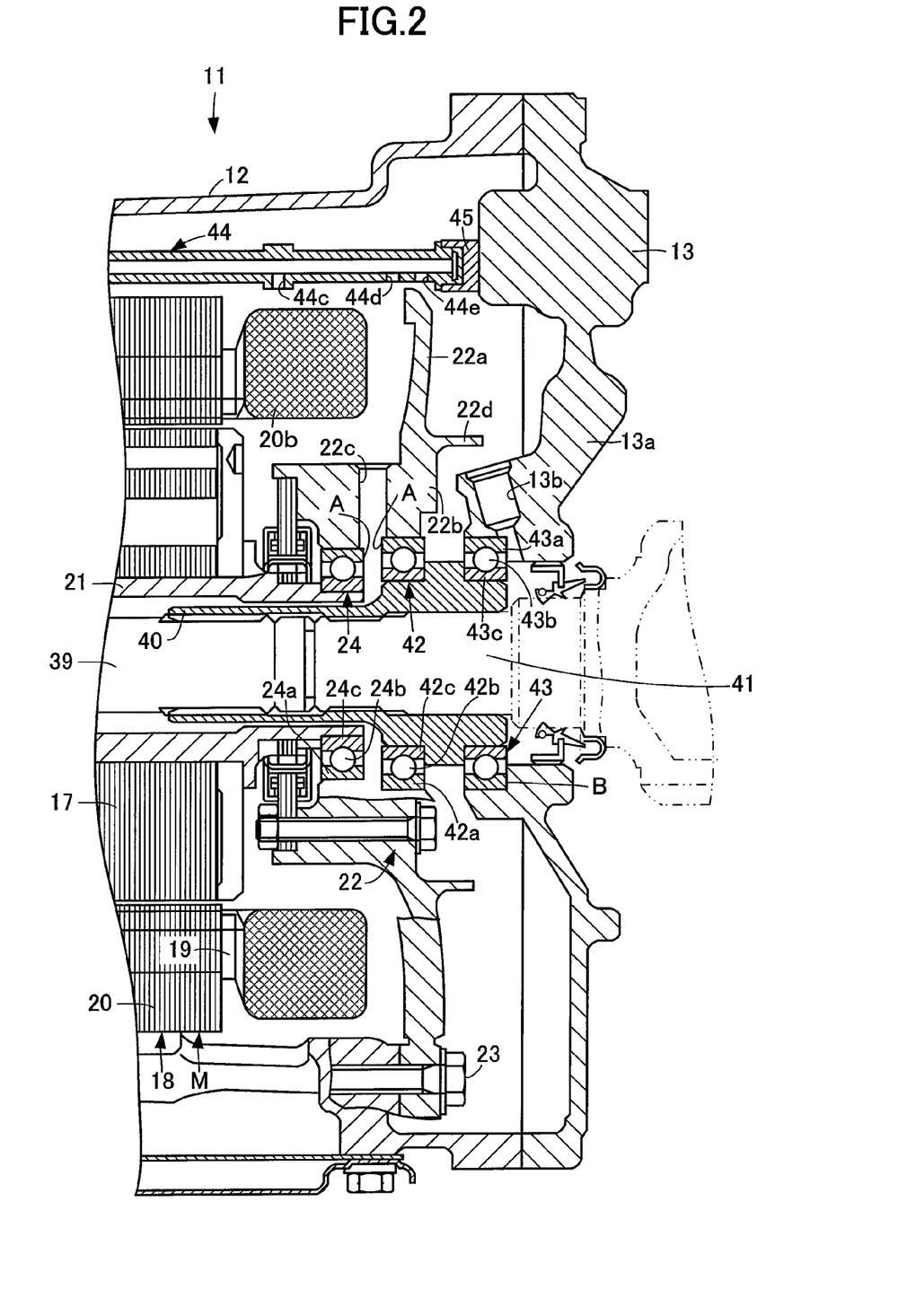
FIG. 2 shows one embodiment of a lubrication structure of a power transmission apparatus according to the present invention, and is a cross sectional view of an essential portion of the transaxle for the electric automotive vehicle and the hybrid vehicle.

In FIGS. 1 and 2, a transaxle 11 constituting part of a vehicular power transmission apparatus of an automotive vehicle is constructed to include a first case 12 in a bottomed cylindrical shape to form part of a case, a cover 13 formed in a disc shape to form part of the case to close the opening end of the first case 12, a motor M accommodated in the first case 12 to serve as a rotating electrical machine, a second case 14 positioned near a partition wall 12a, i.e., a closed end of the first case 12, a planetary gear 15 accommodated in the second case 14, and a differential gear 16 accommodated in the second case 14.

The motor M is constructed to include a rotor 17 having a plurality of permanent magnets embedded therein, and a stator 18 provided around the rotor 17 to surround the rotor 17 and to form a rotating magnetic field. The stator 18 is constructed to include a stator core 19, and a three-phase coil 20 wound around the stator core 19 to serves as a stator coil.

The rotor 17 is securely mounted on a hollow rotor shaft 21 and thus can be integrally rotated with the rotor shaft 21. The stator core 19 is formed with thin magnetic steel sheets laminated, and secured to the first case 12 by a fastening means such as bolts and the like not shown.

To the first case 12, fixed by a bolt 23 is a guide member 22 which rotatably supports the rotor shaft 21 through a bearing 24. The rotor shaft 21 is rotatably supported on the radially inner peripheral portion of the partition wall 12a.

To the inner peripheral surface of the rotor shaft 21, splined is the outer peripheral portion of one axial end portion of the hollow input shaft 26 so that the rotor shaft 21 can be rotated integrally with the input shaft 26.

The other axial end portion of the input shaft 26 is splined to the inner peripheral surface of a sun gear 27, so that the input shaft 26 can be rotated integrally with the sun gear 27.

The planetary gear 15 comprises the sun gear 27, a ring gear 28 provided in coaxial relationship with the input shaft 26 and supported on the second case 14 with no rotation ability, pinion gears 29 arranged between the sun gear 27 and the ring gear 28 to be rotatable around its own axis and revolvable around the sun gear 27, and a planetary carrier 30 secured to a differential case 31 of the differential gear 16 to rotatably support the rotation shafts 29a of the pinion gears 29.

The input shaft 26 is rotatably supported on the partition wall 12a and the planetary carrier 30 through the bearings 33, 34. To the second case 14, coupled is a guide member 32 in a disc shape, and the planetary carrier 30 is rotatably supported on the radially inner peripheral portion of the guide member 32 and the outer peripheral portion of the input shaft 26 through the bearings 34, 35.

The differential gear 16 is constructed to include a differential case 31 connected to the planetary carrier 30, a pinion gear 36 rotatably supported on a pinion shaft 36a connected to the differential case 31, and side gears 37a, 37b held in mesh with the pinion gear 36.

The side gear 37a has an inner peripheral surface splined to one end portion of the drive shaft 38 shown on the left side, while the side gear 37b has an inner peripheral surface splined to one end portion of an intermediate shaft 39.

The intermediate shaft 39 is received in the inner peripheral surfaces of the rotor shaft 21 and the input shaft 26, and has the other end portion splined to the inner peripheral surface of the holder shaft 40.

The inner peripheral surface of the holder shaft 40 is splined to one end portion of the drive shaft 41 shown on the left side. The holder shaft 40 is rotatably supported on the guide member 22 and the cover 13 through the bearings 42, 43.

The transaxle 11 thus constructed is operated to drivably rotate the rotor 17 by the interaction between the magnetic field caused by the permanent magnets embedded in the rotor 17 and the magnetic field caused by the three-phase coil 20.

When the rotor 17 is driven to rotate, the input shaft 26 is rotated by the rotor shaft 21 connected to the rotor 17, and the sun gear 27 is rotated through the input shaft 26.

When the sun gear 27 is rotated, the driving force of the rotor 17 is transmitted to the pinion gears 29 through the sun gear 27, so that the pinion gears 29 are rotated while being revolved around the sun gear 27, thereby causing the planetary carrier 30 to amplify the driving force of the rotor 17.

When the planetary carrier 30 is rotated, the rotation of the planetary carrier 30 is inputted to the differential case 31 to rotate the differential case 31, so that the pinion gear 36 is revolved integrally with the differential case 31, thereby causing the pair of side gears 37a, 37b, and the pair of drive shaft 38 and the intermediate shaft 39 to drivably rotate. As a consequence, the left and right side drive wheels can be driven at the same rotational speed by the drive shaft 41 connected to the drive shaft 38 through the intermediate shaft 39 and the holder shaft 40.

When the difference in rotational resistance is generated between the left and right drive wheels when the vehicle travels on a curved road, the pinion gear 36 is rotated around its own axis while the side gears 37a, 37b are differentially rotated, so that the driving force inputted to the differential case 31 is differentially distributed to the left and right drive wheels through the left and right drive shafts 38, 41.

On the other hand, above the motor M, provided is an oil pipe 44 serving as a lubricating liquid transport pipe, and having one end portion received in an oil passage 46a formed on the upper portion of the first case 12 and the other end portion closed by a closing member 45 provided on the upper portion of the first case 12.

The oil passage 46a is held in communication with an oil passage 46b formed in the upper portion of the first case 12, an oil passages 46c, 46d respectively formed in the upper and side portions of the second case 14. The oil passage 46d is designed to be supplied with the oil serving as lubricating liquid by an oil pump, so that the oil supplied to the oil passage 46d can be supplied to the oil pipe 44 through the oil passages 46c, 46b, and 46a.

The oil pipe 44 can transport the oil from the oil passage 46a above the motor M in the axial direction of the motor M, viz., from the one axial end of the input shaft 26 to the other axial end of the input shaft 26.

The oil pipe 44 is formed with discharge nozzles 44a to 44e. The discharge nozzles 44a, 44c are positioned vertically above the respective coil ends 20a, 20b of the three-phase coil 20 projecting outwardly of the both axial ends of the stator core 19 and being heated to a highest temperature. These discharge nozzles 44a, 44b constitute first discharge nozzles adapted to discharge the oil to the respective coil ends 20a, 20b.

The discharge nozzle 44b is positioned between the discharge nozzles 44a, 44c and vertically above the axially intermediate portion of the motor M, so that the discharge nozzle 44b can discharge the oil to the axially intermediate portion of the motor M. The discharge nozzle 44b constitutes a first discharge nozzle.

The discharge nozzles 44d, 44e are provided in juxtaposed relationship with each other outwardly of the discharge nozzle 44c in the axial direction of the motor M, viz., on the other end portion of the oil pipe 44 to downwardly discharge the oil. In the present embodiment, the discharge nozzle 44d constitutes a second discharge nozzle, while the discharge nozzle 44e constitutes a third discharge nozzle.

The guide member 22 comprises a flange portion 22a extending in the vertical direction toward the discharge nozzles 44d, 44e with respect to the axial direction of the motor M, and a boss portion 22b positioned radially inwardly of the flange portion 22a and integrally formed with the flange portion 22a.

On the radially inner peripheral portion of the guide member 22, viz., the radially inner peripheral portion of the boss portion 22b, bearings 24, 42 are provided, the bearing 24 being in the neighborhood of the motor M in the axial direction of the motor M.

The bearing 24 constitutes a first lubricated member and a first bearing. The bearing 24 has an outer race 24a attached to the radially inner peripheral portion of the boss portion 22b, and an inner race 24c connected to the inner peripheral portion of the outer race 24a through a ball 24b and attached to the outer peripheral portion of the rotor shaft 21. The outer race 24a serves as a first outer race, the inner race 24c serves as a first inner race, and the ball 24b serves as a first rolling member.

The bearing 42 is positioned outwardly of the bearing 24 in the axial direction of the motor M, and constitutes a first lubricated member and a first bearing. The bearing 42 has an outer race 42a attached to the radially inner peripheral portion of the boss portion 22b, and an inner race 42c connected to the inner peripheral portion of the outer race 42a through a ball 42b and attached to the outer peripheral portion of the holder shaft 40. The outer race 42a serves as a first outer race, the inner race 42c serves as a first inner race, and the ball 42b serves as a first rolling member.

As will be understood from the foregoing description, the bearings 24, 42 of the present embodiment are covered with the boss portion 22b of the guide member 22.

The radially inner portion of the cover 13 is formed with a cylindrical portion 13a serving as a cover portion. Between the inner peripheral portion of the cylindrical portion 13a and the outer peripheral portion of the holder shaft 40, provided is a bearing 43 which is positioned outwardly of the bearing 42 in the axial direction of the motor M. The bearing 43 constitutes a second lubricated member and a second bearing.

The bearing 43 has an outer race 43a attached to the radially inner peripheral portion of the cylindrical portion 13a that is the radially inner portion of the cover 13, and an inner race 43c connected to the inner peripheral portion of the outer race 43a through a ball 43b and attached to the outer peripheral portion of the holder shaft 40. The outer race 43a serves as a second outer race, the inner race 43c serves as a second inner race, and the ball 24b serves as a second rolling member.

As will be understood from the foregoing description, the bearing 43 of the present embodiment is covered with the cylindrical portion 13a of the cover 13.

Meanwhile, the boss portion 22b is formed with an oil passage 22c serving as a guide member oil passage, and the oil passage 22c is positioned between the bearings 24, 42 in the axial direction of the motor M to extend in the radial direction of the boss portion 22b. Therefore, the oil discharged from the discharge nozzle 44d freely falls along the flange portion 22a, and is then supplied to the one axial end portion A (see FIG. 2) of the bearings 24, 42 through the oil passage 22c.

The flange portion 22a of the guide member 22 is formed with a guide rib 22d which extends outwardly of the flange portion 22a in the axial direction of the motor M.

The guide rib 22d can receive the oil freely fallen along the flange portion 22a after being discharged from the discharge nozzle 44e to guide the oil along the axial direction of the motor M.

The cylindrical portion 13a of the cover 13 is formed with an oil passage 13b as a case oil passage having an upper opening end opened toward the guide rib 22d and a lower opening end opened toward the one axial end portion B of the bearing 43 (see FIG. 2).

Therefore, the oil guided by the guide rib 22b is supplied to the one axial end portion B of the bearing 43 through the oil passage 13b.

Further, in the present embodiment, the first case 12, the cover 13, the oil pipe 44 and the guide member 22 constitute as a whole the lubrication structure according to the present invention.

Next, the method of lubricating the bearings 24, 42, 43 will be explained hereinafter.

The oil supplied to the oil pipe 44 from the oil pump through the oil passages 46d, 46c, 46b, 46a is discharged (fallen) to the coil ends 20a, 20b and the intermediate portion of the three-phase coil 20 in the axial direction of the motor M (showing oil lubrication paths by the arrows "a" in FIGS. 3 and 4) from the discharge nozzles 44a to 44c.

Figure 3:
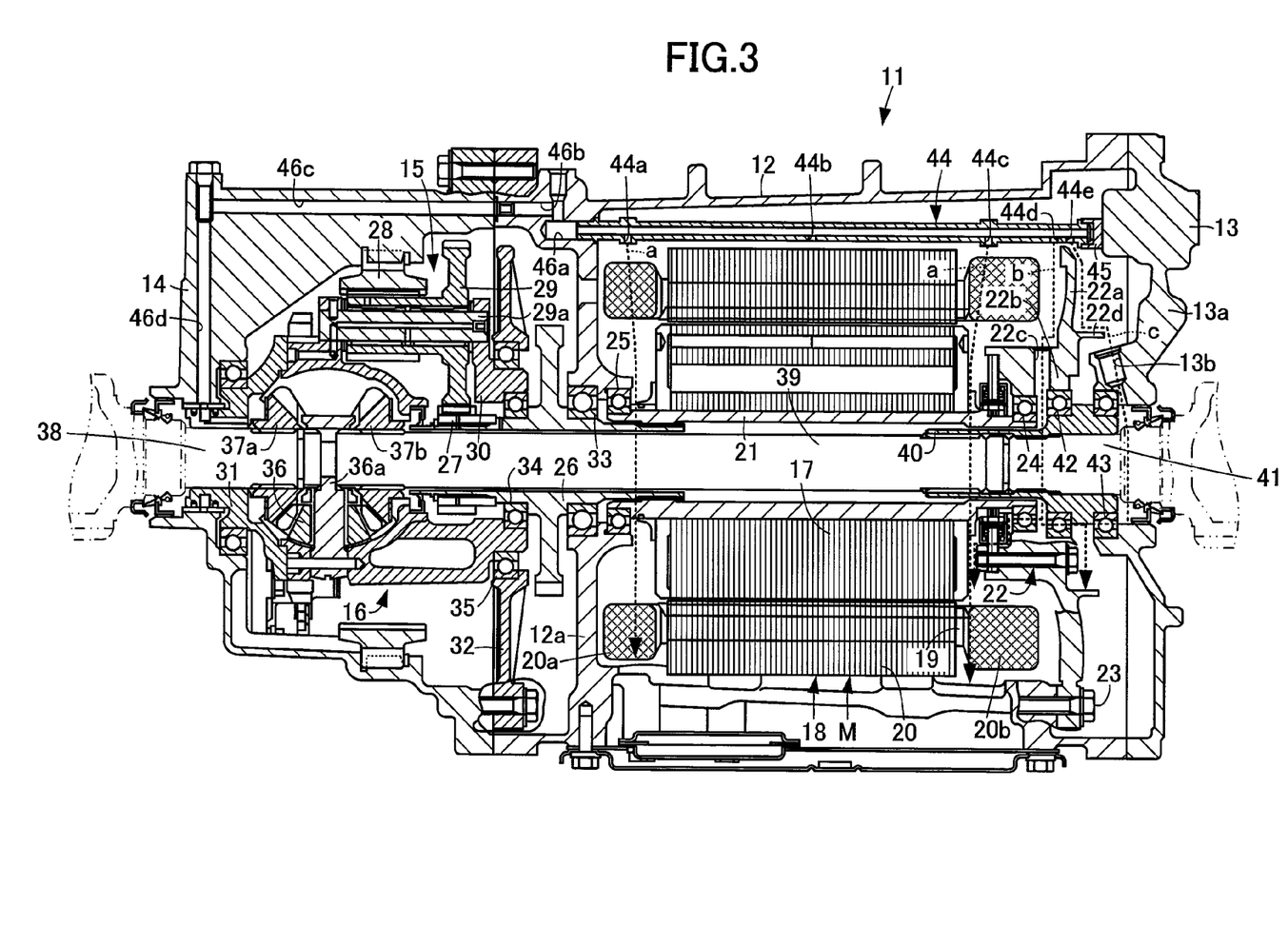
FIG. 3 shows one embodiment of a lubrication structure of a power transmission apparatus according to the present invention, and is a cross sectional view of the transaxle, showing a lubrication path of the oil to be supplied to a bearing.
Figure 4:
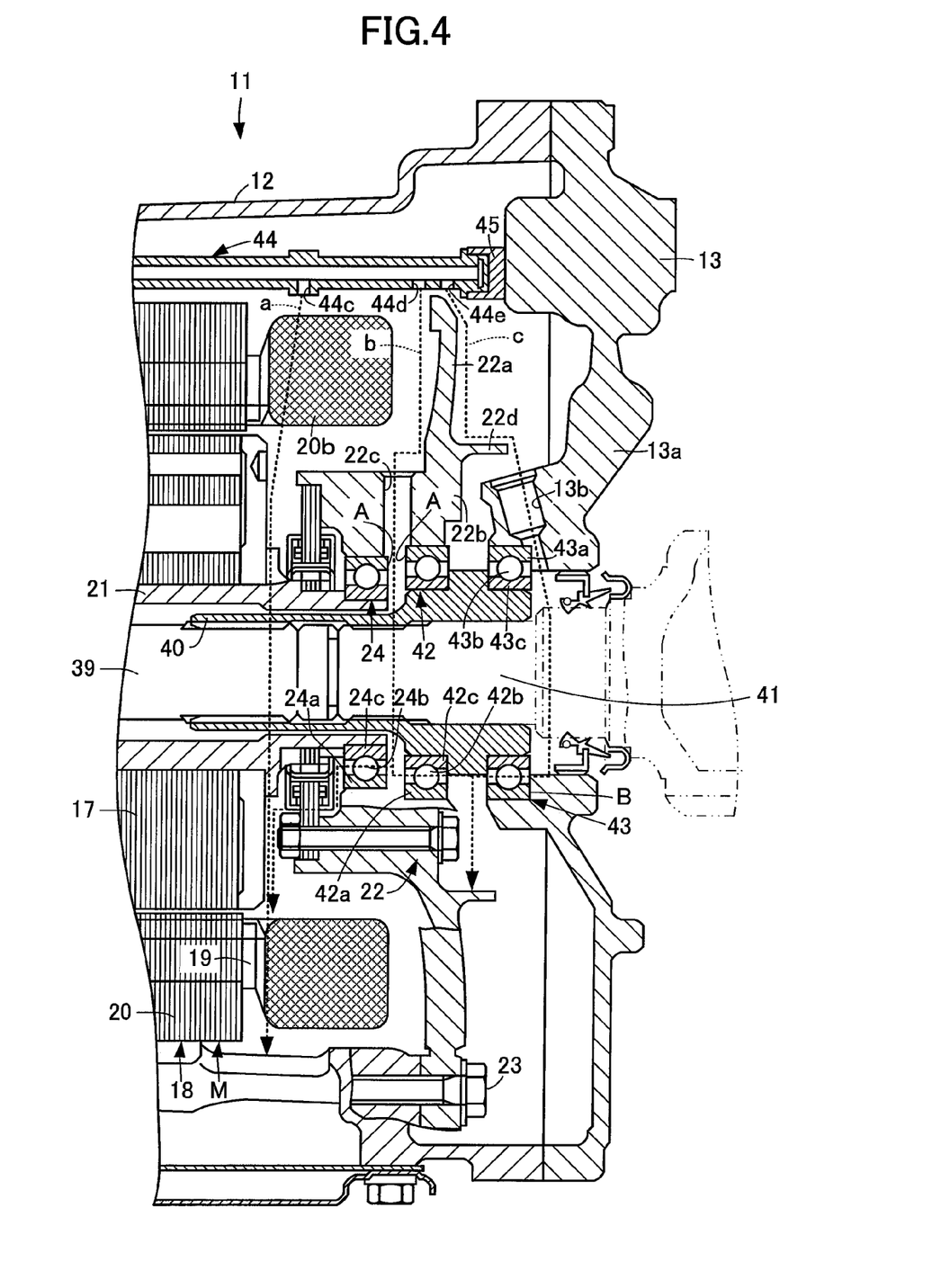
FIG. 4 shows one embodiment of a lubrication structure of a power transmission apparatus according to the present invention, and is a cross sectional view of the essential portion of the transaxle, showing a lubrication path of the oil to be supplied to a bearing.

The oil discharged to the coil ends 20a, 20b and the intermediate portion of the three-phase coil 20 in the axial direction falls to the lower portion of the three-phase coil 20 along the peripheral portion of the three-phase coil 20, so that the stator 18 can be cooled with the heat from the three-phase coil 20 being transmitted to the oil while the oil is falling along the three-phase coil 20. In particular, the oil is supplied to the coil ends 20a, 20b that is heated to the highest temperature in the portions of the three-phase coil 20, thereby making it possible to efficiently cool the three-phase coil 20.

On the other hand, the oil discharged (fallen) from the discharge nozzle 44d freely falls on one of the side surfaces of the flange portion 22a of the guide member 22, and is then supplied to the one axial end portion A (see FIG. 4) of the bearings 24, 42 through the oil passage 22c as shown by the arrow "b" in FIGS. 3 and 4.

The oil is then introduced into the gap between the outer race 24a and the inner race 24c of the bearing 24 to move in the axial direction of the bearing 24, while being introduced into the gap between the outer race 42a and the inner race 42c of the bearing 42 to move in the axial direction of the bearing 42, so that the bearings 24, 42 can be lubricated along the axial direction by the oil.

Further, the oil discharged (fallen) from the discharge nozzle 44e freely falls on the other side surface of the flange portion 22a of the guide member 22, and then falls on the guide rib 22d to move outwardly in the axial direction of the motor M as shown by the arrow "c" in FIGS. 3 and 4.

The oil is then supplied from the forward end of the guide rib 22d to the one axial end portion B of the bearing 43 through the oil passage 13b formed in the cylindrical portion 13a (see FIG. 4).

The oil is then introduced in the gap between the outer race 43a and the inner race 43c of the bearing 43 and then moves along the axial direction of the bearing 43, thereby making it possible to lubricate the bearing 43 along the axial direction.

As will be understood from the foregoing description, the lubrication structure according to the present embodiment is constructed to include the oil pipe 44 having the discharge nozzles 44a, 44c vertically above the coil ends 20a, 20b, and the discharge nozzles 44d, 44e formed on the other end portion of the oil pipe 44 axially outwardly of the discharge nozzle 44c in juxtaposed relationship with each other, and the guide member 22 vertically extending between the discharge nozzles 44d, 44e in the axial direction of the motor M and having the flange portion 22a having a radially inner peripheral portion to cover the upper surfaces of the bearings 24, 42. The guide member 22 has the guide rib 22d extending axially outwardly of the flange portion 22a of the guide member 22 to guide the oil discharged from the discharge nozzle 44e in the axial direction. The cover 13 has the cylindrical portion 13a for covering the upper surface of the bearing 43, and the cylindrical portion 13a is constructed to have an oil passage 13b formed therein to guide the oil guided by the guide rib 22d to the one axial end portion B of the bearing 43.

In the case that lubricating the bearing 43 positioned outwardly of the bearings 24, 42 in the axial direction of the motor M, the oil fallen from the discharge nozzle 44e can be supplied to the one axial end portion B of the bearing 43 through the flange portion 22a of the guide member 22 and the oil passage 13b.

As a result, the present embodiment can use the oil pipe 44 to supply the oil for cooling the coil ends 20a, 20b of the motor M to lubricate the bearing 43 provided axially outwardly of the motor M, and thus eliminate the need for a new lubrication structure for lubricating the bearing 43.

Further, in the present embodiment, the guide member 22 has the oil passage 22c extending radially in the boss portion 22b to guide the oil discharged from the discharge nozzle 44d to the one axial end portion A of the bearings 24, 42, thereby making it possible to lubricate the bearings 24, 42 in addition to the bearing 43.

In particular, in the present embodiment, the bearings 24, 42 are provided in the radially inner peripheral portion of the boss portion 22b of the guide member 22 in juxtaposed relationship with each other, and the oil passage 22c is positioned between the bearings 24, 42 in the axial direction of the motor M, thereby making it possible to reliably supply the oil to the bearings 24, 42 through the oil passage 22c.

In this way, in the present embodiment, it is possible to sufficiently lubricate the bearings 24, 42 having the respective upper portions of the outer races 24a, 42a covered with the guide member 22, and the bearing 43 having the upper portion of the outer race 43a covered with the cylindrical portion 13a.

In the present embodiment, the first lubricated portion is constituted by the bearings 24, 42, while the second lubricated portion is constituted by the bearing 43. In the case that the lubricated member is covered with some member and thus is difficult to be lubricated due to the difficulties in supplying the oil fallen from the above to the lubricated member in the axial direction, the present invention is useful and therefore can be applied to other structures than the bearings raised for example to explain the present invention.

Although the lubrication structure according to the present embodiment is applied to the transaxle 11 of the electric vehicle adapted to drive the drive wheels by the motor M, the present invention may be applied to a transaxle of a hybrid vehicle having a rotating electrical machine including a motor and a generator.

The embodiments disclosed herein are merely exemplified in terms of all aspects, but the present invention is not limited to these embodiments. The scope of this invention is not limited to the explanation about the previously mentioned embodiments, but is defined in the claims to cover the equivalents to the elements or parts defined in the claims and all the modifications within the scope defined in the claims.

As has been explained in the above, the lubrication structure according to the present invention has an advantageous effect in that the lubricating liquid transport pipe for cooling the rotating electrical machine can be used to enable the lubricated member positioned axially outwardly of the rotating electrical machine to be lubricated in the axial direction. The present invention is useful as the lubrication structure of the power transmission apparatus by the reason that the lubricating liquid transport pipe for cooling the rotating electrical machine can be used to allow the lubricated member positioned axially outwardly of the rotating electrical machine to be lubricated in the axial direction.

EXPLANATION OF REFERENCE NUMERALS

11: transaxle (power transmission apparatus)
12: first case (case)
13: cover (case)
13a: cylindrical portion (cover portion)
13b: oil passage (case oil passage)
17: rotor
18: stator
19: stator core
20: three-phase coil (stator coil)
22: guide member
22c: oil passage (guide member oil passage)
22d: guide rib
24, 42: bearing (first lubricated member, first bearing)
24a, 42a: outer race (first outer race)
24b, 42b: ball (first rolling member)
24c, 42c: inner race (first inner race)
43: bearing (second lubricated member, second bearing)
43a: outer race (second outer race)
43b: ball (second rolling member)
43c: inner race (second inner race)
44: oil pipe (lubricating liquid transport pipe)
44a to 44c: discharge nozzle (first nozzle)
44d: discharge nozzle (second discharge nozzle)
44e: discharge nozzle (third discharge nozzle)
M: motor (rotating electrical machine)

The invention claimed is:
1. A lubrication structure of a power transmission apparatus, provided in a power transmission apparatus comprising a rotating electrical machine accommodated in a case having a rotatable rotor, a stator having a stator core provided to surround the rotor, and coil ends axially outwardly projecting from both axial ends of the stator core; a first lubricated member positioned in a neighborhood of the rotating electrical machine in an axial direction of the rotating electrical machine; and a second lubricated member positioned axially outwardly of the first lubricated member, to supply lubricating liquid to the first and the second lubricated members, further comprising:
a lubricating liquid transport pipe having a first discharge nozzle provided above the rotating electrical machine and at least vertically above the coil ends to transport the lubricating liquid from one axial end to the other axial end in the axial direction, and a second discharge nozzle and a third discharge nozzle provided axially outwardly of the first discharge nozzle in juxtaposed relationship with each other; and
a guide member provided between the second discharge nozzle and the third discharge nozzle in the axial direction of the rotating electrical machine to radially extend and having a radially inner peripheral portion covering an upper surface of the first lubricated member;

the guide member having a guide rib axially outwardly extending from the guide member to guide the lubricating liquid discharged from the third discharge nozzle in the axial direction, the case having a cover portion covering an upper surface of the second lubricated member, and the cover portion being formed with a case oil passage for guiding the lubricating liquid guided by the guide rib to one axial end portion of the second lubricated member.

2. A lubrication structure of a power transmission apparatus, as set forth in claim 1, in which the guide member has a guide member oil passage extending radially of the guide member to guide the lubricating liquid discharged from the second discharge nozzle to one axial end portion of the first lubricated member.

3. A lubrication structure of a power transmission apparatus, as set forth in claim 1, in which the first lubricated member is provided in a pair in juxtaposed relationship with each other in the radially inner peripheral portion of the guide member, and the guide member oil passage is positioned between the pair of first lubricated members in the axial direction.

4. A lubrication structure of a power transmission apparatus, as set forth in claim 1, in which the first lubricated member is constituted by a first bearing having a first outer race attached to the radially inner peripheral portion of the guide member and a first inner race connected to an inner peripheral portion of the first outer race through a first rolling member, and the second lubricated member is constituted by a second bearing having a second outer race attached to an inner peripheral portion of the cover portion and a second inner race connected to an inner peripheral portion of the second outer race through a second rolling member.

5. A lubrication structure of a power transmission apparatus, as set forth in claim 2, in which the first lubricated member is provided in a pair in juxtaposed relationship with each other in the radially inner peripheral portion of the guide member, and the guide member oil passage is positioned between the pair of first lubricated members in the axial direction.

6. A lubrication structure of a power transmission apparatus, as set forth in claim 2, in which the first lubricated member is constituted by a first bearing having a first outer race attached to the radially inner peripheral portion of the guide member and a first inner race connected to an inner peripheral portion of the first outer race through a first rolling member, and the second lubricated member is constituted by a second bearing having a second outer race attached to an inner peripheral portion of the cover portion and a second inner race connected to an inner peripheral portion of the second outer race through a second rolling member.

7. A lubrication structure of a power transmission apparatus, as set forth in claim 3, in which the first lubricated member is constituted by a first bearing having a first outer race attached to the radially inner peripheral portion of the guide member and a first inner race connected to an inner peripheral portion of the first outer race through a first rolling member, and the second lubricated member is constituted by a second bearing having a second outer race attached to an inner peripheral portion of the cover portion and a second inner race connected to an inner peripheral portion of the second outer race through a second rolling member.

* * * * *